United States Patent [19]

Hunt

[11] 4,241,413
[45] Dec. 23, 1980

[54] BINARY ADDER WITH SHIFTING FUNCTION

[75] Inventor: David J. Hunt, Hitchin, England

[73] Assignee: International Computers Limited, London, England

[21] Appl. No.: 20,913

[22] Filed: Mar. 15, 1979

[30] Foreign Application Priority Data

Apr. 25, 1978 [GB] United Kingdom ............... 16182/78

[51] Int. Cl.³ .............................................. G06F 7/50
[52] U.S. Cl. .................................... 364/784; 364/716; 364/786
[58] Field of Search ................ 364/784, 785, 786, 716

[56] References Cited

U.S. PATENT DOCUMENTS

| 3,296,426 | 1/1967 | Ball ................................. 364/785 X |
| 3,317,721 | 5/1967 | Berlind ............................ 364/784 X |
| 3,482,085 | 12/1969 | Smith, Jr. .............................. 364/784 |
| 3,749,899 | 7/1973 | Kohoutek et al. ............... 364/785 X |
| 3,767,906 | 10/1973 | Pryor ................................ 364/786 X |

*Primary Examiner*—David H. Malzahn
*Attorney, Agent, or Firm*—Hane, Roberts, Spiecens & Cohen

[57] ABSTRACT

A binary adder has a switching circuit connected to one of its inputs. When activated by a mode selection signal, the switching circuit forces two of the adder inputs to receive the same input signal. In this condition the adder acts effectively as a connector, coupling two of its inputs direct to the sum and carry outputs. The invention is useful in an array processor, for performing additions and shifting operations.

2 Claims, 3 Drawing Figures

BINARY ADDER WITH SHIFTING FUNCTION

BACKGROUND OF THE INVENTION

This invention relates to binary adder circuits.

Binary adder circuits are well known in the art. Such a circuit generally has three inputs for receiving three binary digits which are to be added together, and sum and carry outputs at which appear the results of the addition.

The object of the present invention is to provide a binary adder circuit which, as well as performing its basic function as a conventional adder, is also capable of acting as a connector, for coupling its inputs direct to its outputs. One possible use for such a dual-purpose circuit is in an array processor, as will be described below.

SUMMARY OF THE INVENTION

According to the invention, there is provided a binary adder circuit having three inputs and sum and carry outputs, and means selectively operable in response to a mode selection signal for causing the first and second of the inputs to receive the same input signal so as to make the sum output equal to the third input and the carry output equal to the first or second input.

Thus, it can be seen that the circuit has two modes of operation, according to the state of the mode selection signal. In the first mode, the circuit functions as a normal adder, forming the sum and carry outputs in the conventional manner. However, in the second mode, the circuit effectively acts as a connector, coupling two of the input paths to the sum and carry outputs respectively.

The invention utilises a property of a binary adder circuit that when two of its inputs are equal, the carry output is equal to these two inputs, while the sum output is equal to the other input. This can be seen by inspection of the truth table below, in which X, Y and Z represent the three inputs and S and C represent the sum and carry outputs:

| X | Y | Z | S | C |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

In a preferred embodiment of the invention, the means for causing the first and second inputs to receive the same input signal comprises a switching device (such as a multiplexer, for example) which in the absence of the mode selection signal assumes a first state in which it connects a first input signal to the first input of the adder, second and third input signals being connected directly to the second and third inputs respectively of the adder, and which in the presence of the mode selection signal assumes a second state in which it connects the second input signal to the first input of the adder in place of the first input signal.

According to another aspect of the invention, there is provided an information processing arrangement comprising a sequence of processing cells, each cell containing first and second single-bit registers, a switching device having two inputs respectively connected to the two registers, a binary adder having three inputs and sum and carry outputs, means for connecting the first input to the output of the switching device, means for connecting the second input to the first register, means for connecting the third input to the carry output of the adder in the preceding cell in the sequence (if any), and means for connecting the sum output to the input of the first register, such that when the switching device in each cell selects the output from the second register, the arrangement is able to perform a parallel addition between first and second multi-bit operands contained in the first and second registers respectively, with ripple carry between adjacent cells, and when the switching device in each cell selects the output from the first register the contents of the first register in each cell can be shifted, via the carry output of the adder in that cell, into the third input of the adder in the next cell of the sequence (in any), and then via the sum output of the adder in that next cell into the first register in that next cell.

It can be seen that in such an arrangement, the adders are used not only for their primary purpose of adding operands, but also as connectors for shifting data between the registers of adjacent cells. Moreover, the connection from the carry output of each adder acts both as a ripple carry path and also as a shift path.

BRIEF DESCRIPTION OF THE DRAWINGS

One embodiment of the invention will now be described by way of example with reference to the accompanying drawings of which.

GENERAL DESCRIPTION OF THE ARRAY PROCESSOR

Figure 1:
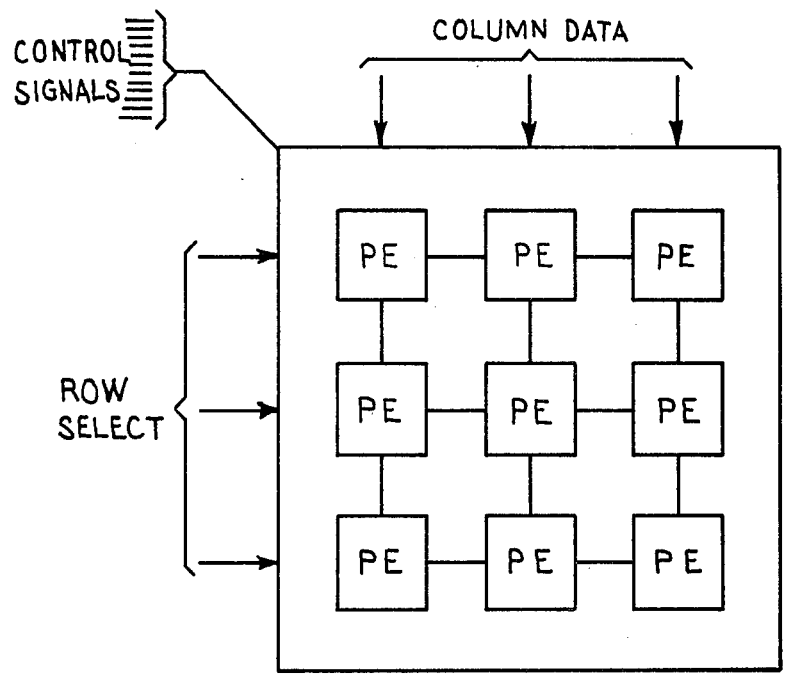
FIG. 1 is a schematic diagram of an array processor.

Referring to FIG. 1, the processor comprises a two-dimensional array of processing elements PE, connected together in rows and columns. Typically there may be 64×64 elements in the array. For convenience, only a small portion of the array is shown. Each element is connected to its four nearest neighbours in the north, east, south and west directions, to permit data to be transferred between them.

Operation of the array is controlled by a set of signals which are broadcast to all the elements in the array, so that each element receives the same signals. These control signals include a ten-bit store address, and the following single-bit control signals: CCLK, QCLK, CEN, ROUTE, QEN, OUTA, AORS, SCLK, SEN, ACLK, AL, NEIGH, MERGE, INV and WE.

Information (either data or control signals) can also be input to the array by a set of COLUMN DATA lines (one per column) or by a set of ROW SELECT lines (one per row).

Figure 2:
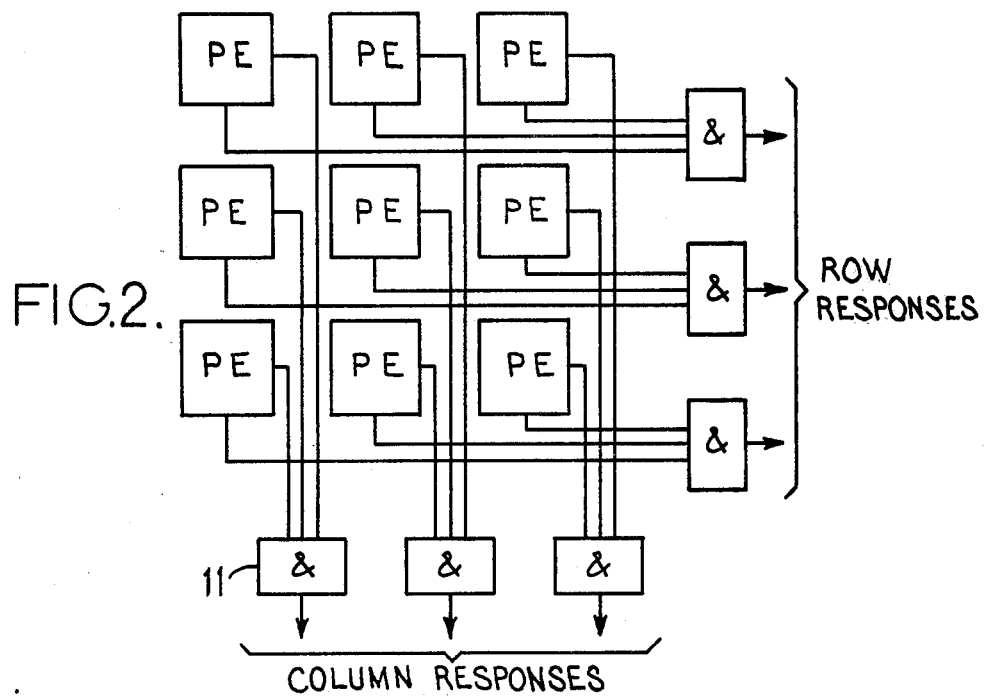
FIG. 2 shows the way in which response signals from the array are formed.

Referring to FIG. 2, data can be output from the array either as a set of COLUMN RESPONSE signals (one per column) or a set of ROW RESPONSE signals (one per row). Each COLUMN RESPONSE signal is formed by combining together outputs from the individual elements in the column in question in an AND circuit. Similarly, each ROW RESPONSE is formed by combining outputs from the elements of the row in question.

PROCESSING ELEMENT—STRUCTURE

Figure 3:
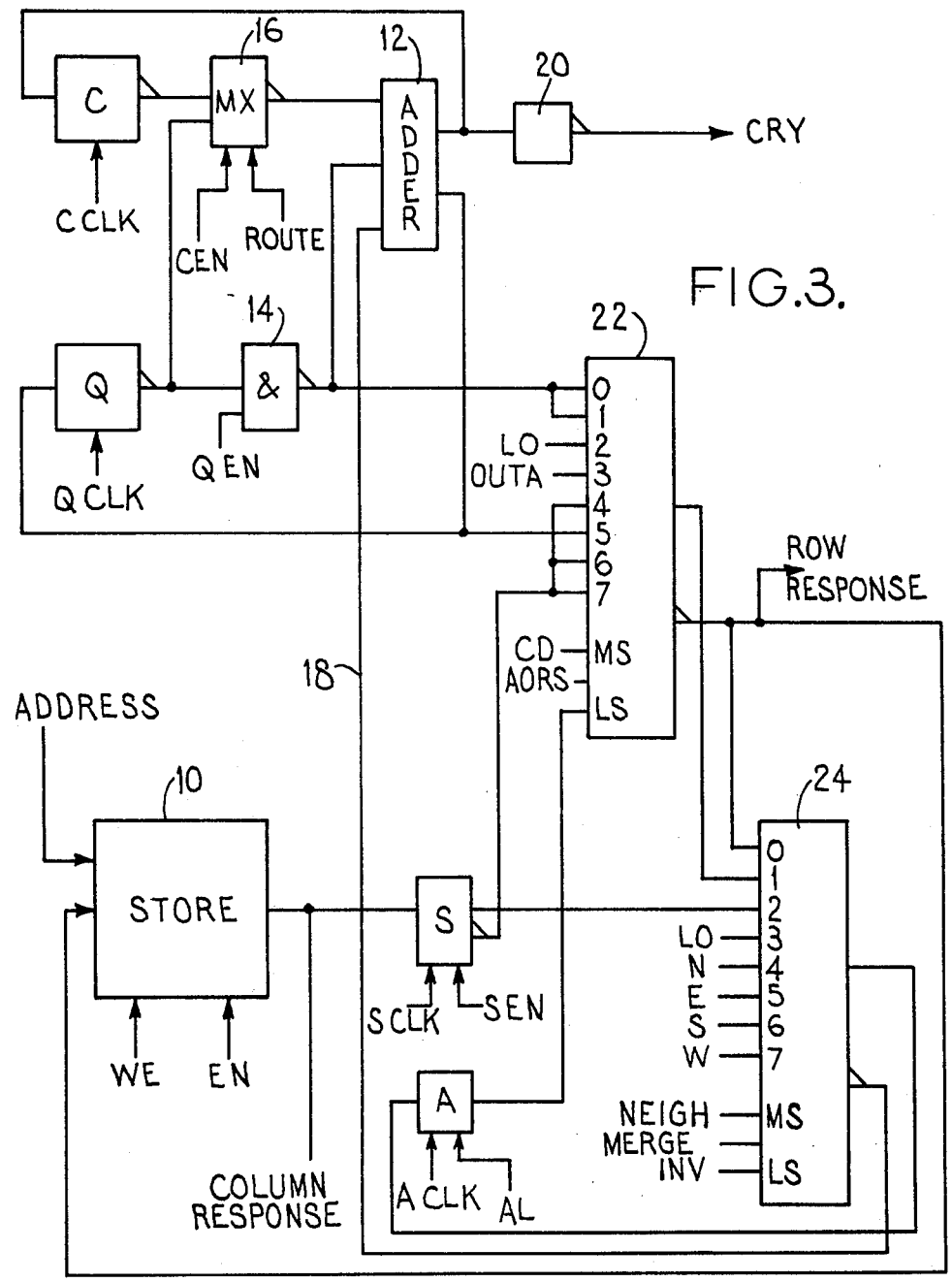
FIG. 3 is a block circuit diagram showing a processing element of the array processor in detail.

Referring to FIG. 3, each processing element PE has a data store 10, which is a 4096-bit random access memory, the bits of which are individually addressable by means of the twelve-bit store address. The store has an enable input EN which is connected to the ROW SELECT line of the row in question. Thus, if a "1" is applied to one of the ROW SELECT lines, all the stores in that row are enabled for reading. The store 10 also has a write enable input which receives the write enable control signal WE. The store is enabled for writing only if both EN=1 and WE=1.

The data output of the store is connected to the AND circuit which forms the COLUMN RESPONSE of the column in question (FIG. 2). This permits the contents of a selected row of stores to be read out of the array.

The processing element includes a single-stage binary adder 12, and two single-bit registers Q and C. The sum and carry outputs of the adder can be gated into the respective registers Q and C by the control signals QCLK and CCLK. The (inverted) output of the Q register can be fed to one input of the adder by way of a NAND gate 14, when the control signal QEN=1.

A multiplexer 16 normally connects the (inverted) output of the C register to the adder but, when the control signal ROUTE=1, connects the output of the Q register to the adder instead. Thus, in this situation, the output of the Q register is applied simultaneously to two inputs of the adder, and therefore appears unchanged at the carry output, while the signal on the other input 18 of the adder appears unchanged at the sum output. Thus, it can be seen that when ROUTE=1, the adder effectively acts as a connector. The multiplexer is enabled for operation by the control signal CEN.

The carry output of the adder is applied to an inverter gate 20 to produce a carry output signal CRY which is transmitted to the four neighbouring processing elements in the north, east, south and west directions.

The processing element also includes two further single-bit registers: a store buffer register S, which receives the output data from the store 10, and an activity bit register A. The S register is enabled for operation by the control signal SEN, and data is gated into it by the signal SCLK. Data can be gated into the A register by means of the signal ACLK. The A register can also operate as a latch, by setting the control signal AL=1, in which case the A register will form the AND function of successive inputs applied to it.

Data transfer within the processing element is controlled by two 8:1 multiplexers 22 and 24. Each of these has eight data inputs, numbered 0-7, and three control inputs connected as shown. The binary code on the three control inputs determines which of the data inputs is selected. For example, when NEIGH=0, MERGE=1 and INV=1, the multiplexer 24 selects input number 3 (since 011 represents 3 in binary notation). The connections to the inputs are as shown in the drawing. The inputs N, E, S and W receive the carry signals CRY from the neighbouring processing elements in the north, east, south and west directions respectively. The signals LO are permanently wired low voltages representing "0". The input CD is connected to the COLUMN DATA line of the column in question.

OPERATION

It will be appreciated by those skilled in the art that that array processor described above can be made to perform a large variety of different data processing operations by applying different combinations of control signals to the array. Two of these operations, RIPPLE ADD and ROUTE Q will now be described in detail, since they illustrate the use of the present invention.

RIPPLE ADD

In this case, two multi-bit operands are placed in the C and Q registers respectively of a row of processing elements, i.e. each operand is spread out along a row of elements. The control signals NEIGH, MERGE and INV are all set equal to "1", while the signal ROUTE is set equal to zero.

Since ROUTE=0, the multiplexer 16 selects the output of the C register. The adder 12 therefore performs a normal addition of the contents of the Q and C registers. The carry-in signal for this addition is derived from the carry output CRY of the western neighbour of the processing element, by way of the multiplexer 24 which selects input number 7.

Thus, it can be seen that the effect of this operation is to cause parallel addition of the two multi-bit operands, with ripple carry between adjacent bits.

ROUTE Q

In this case, the control signals NEIGH and ROUTE are both set to "1". The two control signals MERGE and INV are used as a routing code to specify one of the four directions (north, east, south and west) as follows:

| MERGE | INV | DIRECTION |
|---|---|---|
| 0 | 0 | North |
| 0 | 1 | East |
| 1 | 0 | South |
| 1 | 1 | West |

The multiplexer 24 selects one of the inputs N, E, S or W according to the value of this code. The selected input is applied to the input path 18 of the adder. Because the control signal ROUTE=1, the multiplexer 16 is activated as described above, causing the signal on path 18 to be conveyed to the sum output of the adder (whence it can be gated into the Q register), and causing the output of the Q register to be conveyed to the carry output of the adder (whence it is transmitted to the neighbouring processing elements). In summary, it can be seen that this operation causes the contents of the Q register in each processing element to be shifted into the Q register of the neighbouring element in the direction specified by the routing code (MERGE, INV).

What is claimed is:

1. An information processing arrangement comprising a sequence of processing cells, each cell containing first and second single-bit registers, a switching device having two inputs respectively connected to the two registers, a binary adder having three inputs and sum and carry outputs, means for connecting the first input to the output of the switching device, means for connecting the second input to the first register, means for connecting the third input to the carry output of the adder in the preceding cell in the sequence (if any), and means for connecting the sum output to the input of the first register, such that when the switching device in each cell selects the output from the second register, the arrangement is above to perform a parallel addition between first and second multi-bit operands contained in the first and second registers respectively, with ripple carry between adjacent cells, and when the switching device in each cell selects the output from the first register the contents of the first register in each cell can be shifted, via the carry output of the adder in that cell, into the third input of the adder in the next cell of the sequence (if any), and then via the sum output of the adder in that next cell into the first register in that next cell.

2. A circuit arrangement comprising
(a) a binary adder circuit having first, second and third inputs and sum and carry outputs;
(b) first, second and third signal input paths; and
(c) a switching device having two inputs which are connected respectively to the first and second signal input paths and having an output which is connected to the first input of the adder,
(d) the second and third inputs of the adder being connected respectively to the second and third signal input paths;
(e) the switching device thereby being operable to cause the first and second inputs of the adder to receive the same input signal so as to make the sum output equal to the third input and the carry output equal to the first or second input.

* * * * *